United States Patent [19]

Mione

[11] Patent Number: 4,675,537
[45] Date of Patent: Jun. 23, 1987

[54] CURRENT-CONTROLLED ON/OFF POWER LINE SWITCHING OF ELECTRICAL DEVICES

[75] Inventor: Lawrence J. Mione, Brentwood, N.Y.

[73] Assignee: Voltec Corporation, Plainview, N.Y.

[21] Appl. No.: 718,663

[22] Filed: Apr. 1, 1985

[51] Int. Cl.⁴ .......................................... H01H 47/32
[52] U.S. Cl. .................................. 307/38; 307/112; 307/125; 307/130
[58] Field of Search .................. 307/38, 39, 43, 42, 307/71, 73, 129, 130, 131, 132 R, 132 E, 112, 141, 113, 141.4, 116, 125; 361/91, 92, 93, 111, 90

[56] References Cited

U.S. PATENT DOCUMENTS

| | | | |
|---|---|---|---|
| 3,416,001 | 12/1968 | Fistell | 307/38 |
| 3,560,861 | 2/1971 | Milleker et al. | 307/130 X |
| 3,571,707 | 3/1971 | Houck | 361/92 X |
| 3,717,796 | 2/1973 | Simpson et al. | 361/187 X |
| 3,784,846 | 1/1974 | Krick et al. | 361/92 X |
| 3,836,790 | 9/1974 | Becker | 361/90 X |
| 3,940,664 | 2/1976 | Matsko | 361/92 |
| 4,027,203 | 5/1977 | Moran et al. | 361/89 X |
| 4,034,269 | 7/1977 | Wilkinson | 361/187 X |
| 4,054,802 | 10/1977 | Mock | 307/38 |
| 4,204,148 | 5/1980 | Gaertner | 361/92 X |
| 4,331,995 | 5/1982 | Voss | 361/92 X |
| 4,331,996 | 5/1982 | Matsko et al. | 361/92 |
| 4,333,119 | 6/1982 | Schoenmeyr | 361/92 X |
| 4,346,307 | 8/1982 | Zulaski | 361/90 X |
| 4,383,186 | 5/1983 | Liang | 307/113 |
| 4,456,943 | 6/1984 | Judy | 307/116 X |
| 4,466,040 | 8/1984 | Barthel et al. | 307/130 X |

OTHER PUBLICATIONS

"HiFi Auto-Switch", by Electronics Australia (Mar. 1980), vol. 41, No. 12.

Primary Examiner—William M. Shoop, Jr.
Assistant Examiner—Shik Luen Paul Ip
Attorney, Agent, or Firm—Nolte, Nolte and Hunter

[57] ABSTRACT

A switching control circuit has first and second output terminals, the first output terminal being connected by way of a control resistor to one of a pair of input terminals which, in use of the circuit are connected to an electrical power source, the second output terminal being connected to the other input terminal. A sensing and delay portion of the circuit is connected across the resistor and, in response to current flowing through the resistor when the power switch of a first electrical device, such as a disc drive, connected to the input terminals is initially turned on, energizes a relay after a predetermined time delay elapses from the time that the resistor current reaches a given threshold value, the energized relay serving to connect one or more pairs of other output terminals of the circuit across the pair of input terminals, so that source power will then be supplied via the relay to the other output terminal pairs and to any other electrical devices, such as a monitor, printed and computer, whose power input terminals are respectively connected thereto. Following turn-off of the power switch, the same circuit portion deenergizes the relay after a second predetermined time delay elapses from the time that resistor current diminishes to a second given threshold value, so that source power to the other electrical devices will cease. Use of a high gain amplifier at the input of the sensing and delay portion of the circuit sharply reduces the power dissipation required of the resistor for any given threshold value of current therethrough, thus providing consequent cool operation and avoiding fuse or other line protection.

4 Claims, 2 Drawing Figures

CURRENT-CONTROLLED ON/OFF POWER LINE SWITCHING OF ELECTRICAL DEVICES

FIELD OF THE INVENTION

This invention relates to electrical control circuits and, more particularly, to such circuits which control the on/off power line switching of electrical devices.

BACKGROUND OF THE INVENTION

It has been an ongoing problem in the use of computer systems to control the switching on and off of peripheral devices, such as monitors, printers and modems. One aspect of the problem is the inconvenience and the expenditure of valuable time in individually operating the power switch of each peripheral device, whether on the device or remotely located therefrom. Another aspect of the problem involves a solution heretofore attempted by which a master power switch has been utilized to control the energization and/or deenergization of all the peripheral devices simultaneously. This solution, however, has a serious drawback in that it often causes undefined logic states on the I/O busses of the simultaneously switched peripheral devices, although this drawback is somewhat mitigated if one device quiesces before the others.

SUMMARY OF THE INVENTION

Accordingly, it is an object of the invention to provide a circuit arrangement for controlling the switching on and/off of a plurality of computer peripheral devices and the like with optimum convenience and minimum time expenditure.

Another object is to provide the aforementioned circuit arrangement with the property of switching all the devices on and off with a single switch and without creating any operational problems thereby.

These objects are fulfilled and still other advantages are provided, in accordance with the invention, by a switching control circuit for electrical devices comprising:

(a) a pair of input terminals which, in use of the circuit, are connected to a source of power for electrical devices whose switching on and off is to be effected;

(b) a control resistor;

(c) a first pair of output terminals, one terminal of which is connected by way of the control resistor to one of the input terminals, the other output terminal being connected to the other input terminal;

(d) a second pair of output terminals;

(e) energizable means responsive to energization thereof for connecting the second pair of output terminals across the pair of input terminals; and (f) sensing and delay means which, at its input, is connected across the control resistor and which, in response to current flow through the control resistor when a first electrical device having an on/off power switch is connected to the pair of input terminals and its power switch is initially turned on, energizes the energizable means after a predetermined time delay elapses from the time that the current flow through the control resistor reaches a given threshold value, whereby power from the power source will then be supplied via the energizable means to the second pair of output terminals and to any second electrical device whose power input terminals are connected thereto.

Preferably, the sensing and delay means is operative to deenergize the energizable means after a second predetermined time delay elapses from the time it senses that the current flow through the control resistor has diminished to a second given threshold value lower than the first given threshold value following turn-off of the power switch, whereby power from the power source will then cease to be supplied via the energizable means to the second pair of output terminals and to any second electrical device whose power input terminals are connected thereto.

At least one additional pair of output terminals may be connected in parallel with the second pair of output terminals, whereby the delayed switching on or off of power to several electrical devices under the master control of the on/off power switch of the first electrical device may be achieved.

BRIEF DESCRIPTION OF THE DRAWINGS

In order that the invention may be fully understood, it will now be described with reference to the drawings, in which.

DETAILED DESCRIPTION OF THE INVENTION

Figure 1:
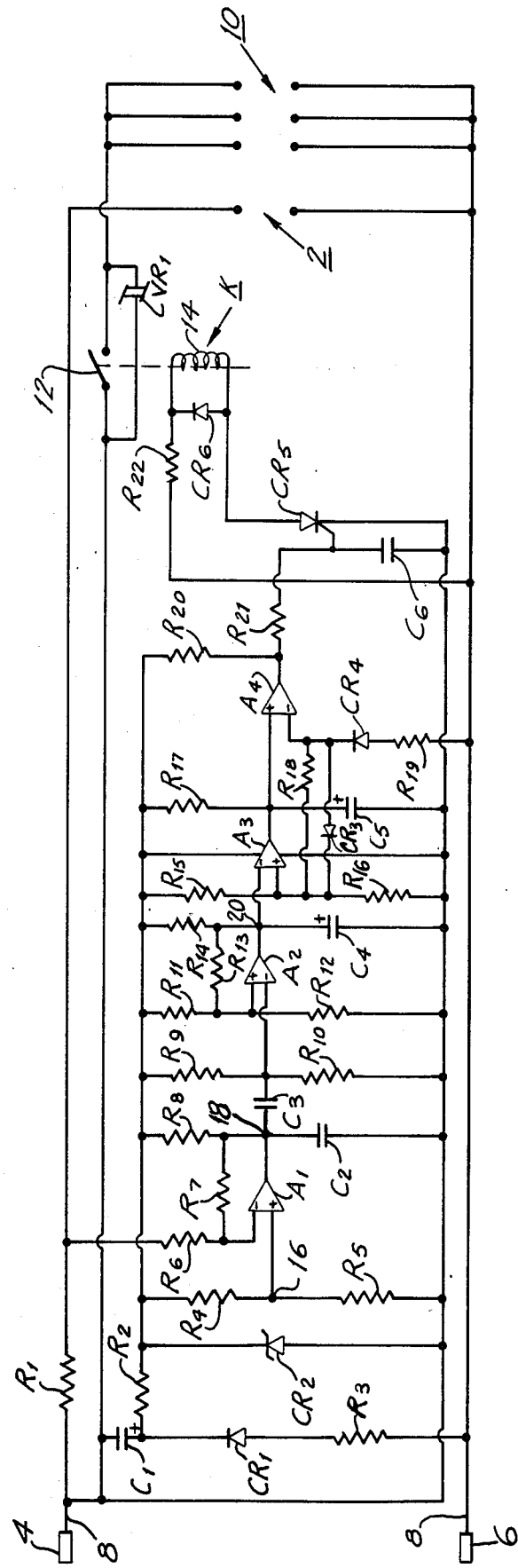
FIG. 1 is a schematic wiring diagram of a control circuit embodying the invention.

Referring to FIG. 1, the function of the control circuit depicted therein is to briefly delay the actuation of a relay K relative to the occurrence of at least one given current threshold value. The control circuit can thereby control, for example, all the peripheral devices in a computer system with a single on/off switch on whichever peripheral device is selected: monitor, printer or modem.

A first outlet 2 of the control circuit is intelligent, and it is energized whenever plug elements 4 and 6 of line cord conductors 8, 8 are plugged into a live outlet at which 110-volt, 60 Hz current is available. The current through first outlet 2 is continuously monitored by the control circuit. In utilizing the control circuit, the selected peripheral device is plugged into first outlet 2 and the single on/off switch of that device is turned on, serving as a master switch. When a current of more than 0.2 ampere flows through first outlet 2, a plurality 10 of other outlets (as shown, three in number) automatically turn on after a brief time delay. The time delay prevents nuisance tripping of relay K and permits the selected device to reach a quiescent state. When the single on/off switch of the selected peripheral device is turned off and a current of less than 0.1 ampere flows through first outlet 2, outlets 10 automatically turn off after a brief dropout delay. This is particularly advantageous if outlets 10 are used for peripheral devices without power switches of their own or with power switches inconveniently located.

In FIG. 1, it is seen that first outlet 2 is connected in series with a resistor $R_1$. The control circuit monitors current flow through first outlet 2 via the voltage across resistor $R_1$. This voltage is amplified by a high gain amplifier $A_1$ which sharply reduces the power dissipation required of resistor $R_1$ for any given current threshold. Thus, resistor $R_1$ can have, for example, a 0.02 ohm value and remain cool notwithstanding current flow therethrough of, for example, 15 amperes; and any necessity for placing a fuse in series with resistor $R_1$ or a double-diode shunting network in parallel with resistor $R_1$ for protective purposes is eliminated.

The output of amplifier $A_1$ is AC coupled through a capacitor $C_3$ to be biased by resistors $R_9$ and $R_{10}$. The combination of resistors $R_{11}$ and $R_{12}$ sets a threshold for a comparator stage $A_2$. When this threshold is exceeded by the AC signal at the output of amplifier $A_1$, comparator stage $A_2$ switches low. This, in turn, starts a time delay by way of another comparator stage $A_3$. The duration of the time delay is established by the product of a capacitor $C_5$ and a resistor $R_{17}$. The resulting slowly rising output from comparator stage $A_3$ in conjunction with a diode $CR_3$, a diode $CR_4$, a resistor $R_{18}$ and a resistor $R_{19}$ form the differential inputs for a comparator stage $A_4$. This, in turn, produces a zero crossing gate pulse fed via a resistor $R_{21}$ to the gate electrode of a silicon-controlled rectifier $CR_5$ for initial turn-on thereof, the gate electrode being tied to the cathode of Zener diode $CR_2$ via a capacitor $C_6$.

The zero crossing gate pulse widens on each successive cycle and soon transforms into a DC level. Silicon-controlled rectifier $CR_5$ actuates relay K to close relay contacts 12 by energizing relay coil 14 with half-wave excitation at a conduction angle greater than 150°. When silicon-controlled rectifier $CR_5$ is not conducting, adequate holding current through relay coil 14 is maintained by a free wheeling diode $CR_6$ connected across the coil. A resistor $R_{22}$ reduces the RMS voltage level at coil 14 from approximately 60 V to approximately 50 V. Cyclical contact bounce of relay contacts 12 during the first several cycles is prevented by the zero cross of initial turn-on of silicon-controlled rectifier $CR_5$. Protection of relay contacts 12 against sustained arcing due to reactive load breaks is provided by a voltage variable resistor $VR_1$, such as a metal oxide varistor (MOV), connected across the contacts.

The control circuit of FIG. 1 includes a power supply portion consisting of a capacitor $C_1$, a rectifier diode $CR_1$, a Zener diode $CR_2$, a resistor $R_2$ and another resistor $R_3$. A series connection of capacitor $C_1$, diode $CR_1$ and resistor $R_3$ is made across line cord conductors 8, 8; and a series connection of resistor $R_2$ and Zener diode $CR_2$ is made across capacitor $C_1$. This provides a regulated 7.5 V DC at 3 mA with very low ripple across a voltage divider formed by a resistor $R_4$ in series with a resistor $R_5$, the common terminal 16 of which is connected to the positive input of high gain amplifier $A_1$. The negative input of amplifier $A_1$ is connected via a resistor $R_6$ to the line conductor 8 associated with plug element 4 and at the side of resistor $R_1$ remote from plug element 4. A resistor $R_7$ is connected between the negative input of amplifier $A_1$ and an output terminal 18 of the amplifier to which one side of AC coupling capacitor $C_3$ is also connected. A capacitor $C_2$ is connected between terminal 18 and the cathode of Zener diode $CR_2$. A resistor $R_8$ connects terminal 18 to the anode of Zener Diode $CR_2$.

The dropout delay is established by a resistor $R_{14}$ and a capacitor $C_4$ in conjunction with comparator stage $A_2$. To this end, a terminal 20 in the connection of the output of comparator stage $A_2$ to the negative input of comparator stage $A_3$ is connected to one side of capacitor $C_4$, the other side of which is returned to the cathode of Zener diode $CR_2$; whereas, resistor $R_{14}$ is connected between terminal 20 and the anode of Zener diode $CR_2$. The hysteresis level is established by comparator stage $A_2$ in conjunction with a resistor $R_{13}$ connected between output terminal 20 and the positive input terminal of comparator stage $A_2$.

A resistor $R_{15}$ which is connected between the positive terminal of comparator stage $A_3$ and the anode of Zener diode $CR_2$ forms a voltage divider with a resistor $R_{16}$ which is connected between the positive terminal of stage $A_3$ and the cathode of Zener diode $CR_2$. A resistor $R_{18}$ interconnects the positive terminal of comparator stage $A_3$ with the negative terminal of comparator stage $A_4$, and is connected in parallel with a diode $CR_3$ which swamps leakage current produced by diode $CR_4$ when plug element 6 goes negative with respect to plug element 4.

Figure 2:
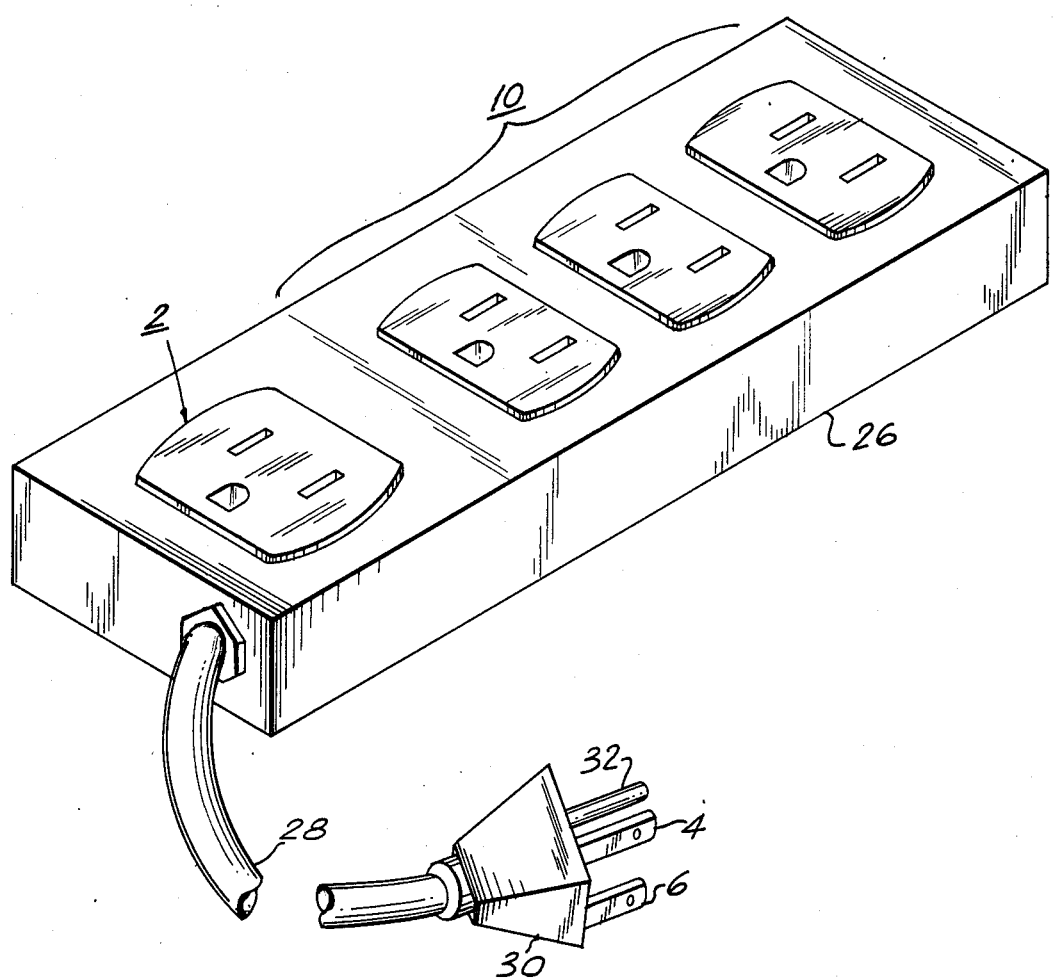
FIG. 2 is an isometric view of a housing for the control circuit of FIG. 1 showing a cord and plug assembly associated therewith to be connected to a power line and also showing several sockets for receiving the respective plugs of similar assemblies associated with the devices to be controlled.

Referring now to FIG. 2, a metal housing 26 containing the control circuit of FIG. 1 has a power line cord 28 (including the line conductors 8, 8) entering it at one end. The free end of line cord 28 is provided with a plug 30 having plug elements 4 and 6 projecting therefrom to be plugged into a live outlet at which 110-volt, 60 Hz current is available. Also projecting from plug 30 is a ground element 32 employed in the customary manner for ground protection of housing 26.

On the upper surface of housing 26, respective portions of intelligent socket 2 and of the plurality 10 of other sockets are seen slightly projecting thereabove for receiving the electrical plugs of the selected peripheral device and the peripheral devices whose on/off stages are to be under the master control of the on/off switch of the selected peripheral device plugged into intelligent socket 2.

Although a single embodiment of the invention has been described and illustrated, it is to be understood that the invention may be embodied in a number of other ways which would readily occur to those with ordinary skill in the appertaining art without departing from the scope of the invention as claimed.

What is claimed is:

1. A switching control circuit for electrical devices, comprising:
   (a) a pair of input terminals which, in use of said circuit, are connected to a source of power for electrical devices whose switching on and off is to be effected;
   (b) a control resistor;
   (c) a first pair of output terminals, one terminal of which is connected by way of said control resistor to one of said input terminals, the other output terminal being connected to the other input terminal, said output terminals to be connected in power supplying relation to a first electrical device having an on/off power switch;
   (d) a second pair of output terminals;
   (e) energizable means responsive to energization thereof for connecting said second pair of output terminals across said pair of input terminals; and
   (f) sensing and delay means including a high gain amplifier having an input connected across said control resistor for producing a voltage output in response to current caused to flow through said control resistor when the first electrical device is connected to said first pair of output terminals and its said on/off power switch is initially turned on, said sensing and delay means further including circuitry coupled to said high gain amplifier and responsive to said voltage output thereof for energizing said energizable means after a predetermined time delay elapses from the time that said high gain amplifier voltage output reaches a given threshold value, whereby power from said power source will then be supplied via said energizable means to said second pair of output terminals and to any second electrical device whose power input terminals are connected thereto.

2. A switching control circuit according to claim 1, wherein said energizing circuitry is additionally responsive to the voltage output of said high gain amplifier for deenergizing the energizable means after a second predetermined time delay elapses from the time that the high gain amplifier voltage output has diminished to a second given threshold value lower than the first given threshold value following turn-off of said power switch, whereby power from said power source will then cease to be supplied via said energizable means to said second pair of output terminals and to any second electrical device whose power input terminals are connected thereto.

3. A switching control circuit according to claim 1, wherein at least one additional pair of output terminals are connected in parallel with said second pair of output terminals.

4. A switching control circuit according to claim 2, wherein at least one additional pair of output terminals are connected in parallel with said second pair of output terminals.

* * * * *